United States Patent [19]

Hartz et al.

[11] Patent Number: 5,261,215

[45] Date of Patent: Nov. 16, 1993

[54] VERTICALLY STORABLE LAWN MOWER

[75] Inventors: Adrian E. Hartz, Greenville; Charles K. Long, Seneca, both of S.C.

[73] Assignee: Ryobi Motor Products Corp., Easley, S.C.

[21] Appl. No.: 920,134

[22] Filed: Jul. 24, 1992

[51] Int. Cl.⁵ .............................................. B62B 5/06
[52] U.S. Cl. ................................. 56/11.9; 16/111 A; 56/DIG. 18; 280/47.371; 280/655.1
[58] Field of Search ................ 280/655.1, 47.371, 642; 16/111 A, 111 R; 56/16.7, 17.5, DIG. 18, 11.9, 1

[56] References Cited

U.S. PATENT DOCUMENTS

| | | | |
|---|---|---|---|
| 3,357,716 | 12/1967 | Musichuk | 280/47.371 |
| 3,423,103 | 1/1969 | Maltapp | 16/111 A X |
| 3,462,924 | 8/1969 | Price et al. | 16/111 A X |
| 3,485,017 | 12/1969 | Duran et al. | 56/17.5 |
| 3,527,469 | 9/1970 | Gobin | 280/655.1 |
| 3,604,187 | 9/1971 | Weber | 56/249 |
| 3,649,997 | 3/1972 | Thorud | 16/111 A |
| 3,694,855 | 10/1972 | Meyer et al. | 280/655.1 X |
| 3,816,873 | 6/1974 | Thorud et al. | 16/111 A |
| 3,950,817 | 4/1976 | McKaig | 16/111 A |

Primary Examiner—David J. Bagnell
Attorney, Agent, or Firm—Brooks & Kushman

[57] ABSTRACT

A lawn mower is provided having a deck which is supported by a pair of front wheels and a pair of rear wheels above a surface when operated in a horizontal mode. A leg is affixed to a rear portion of the deck and projects outwardly therefrom. A handle assembly is affixed to the deck so as to be movable between an extended operating position and a retracted storage position. The leg cooperates with the pair of rear wheels to provide a stable support for the lawn mower enabling generally vertical storage of the lawn mower relative to the surface once the handle assembly has been moved to the retracted storage position.

27 Claims, 3 Drawing Sheets

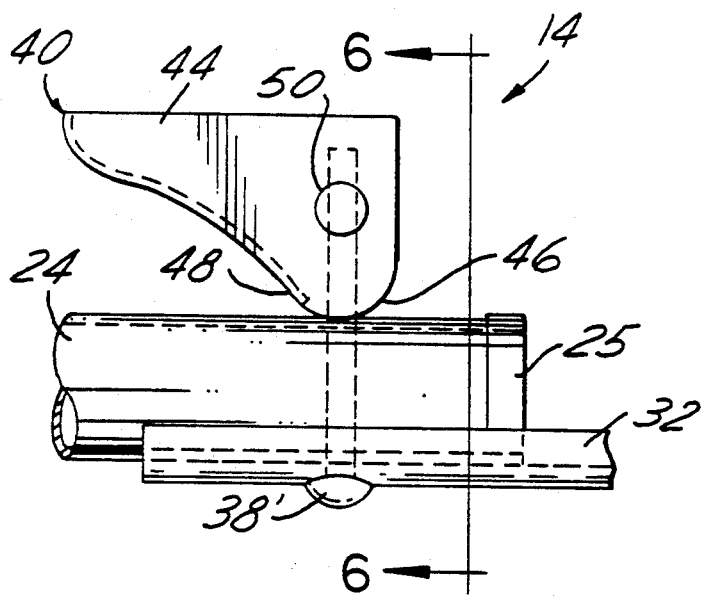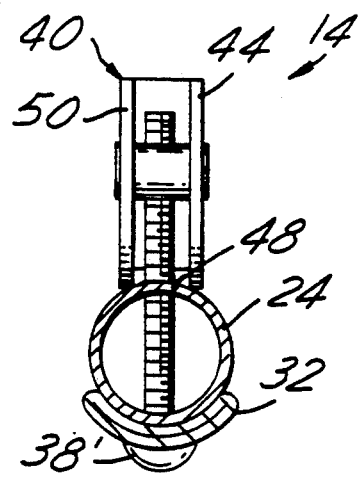
fig-5
fig-6
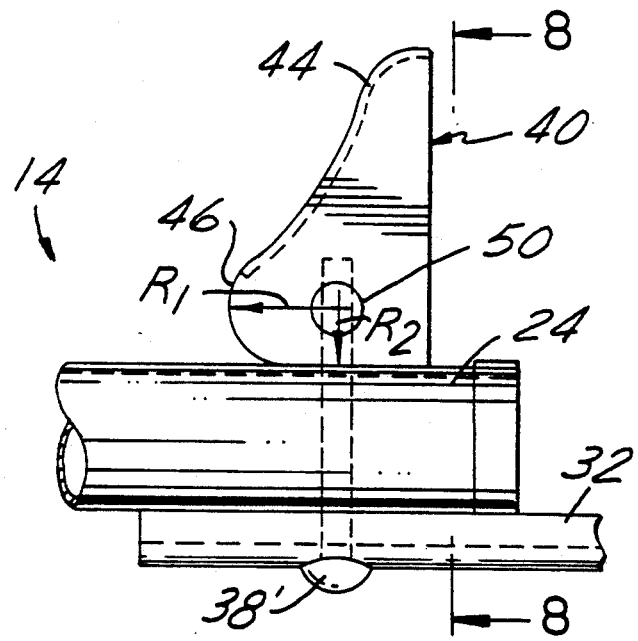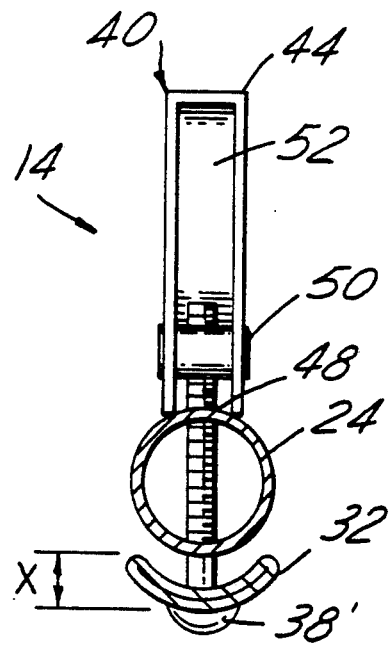
fig-7
fig-8

VERTICALLY STORABLE LAWN MOWER

TECHNICAL FIELD

This invention relates to lawn mowers, and more particularly to a lawn mower adapted for compact storage when not in use.

BACKGROUND ART

Lawn mowers, in most locations, are a seasonal type of equipment that is normally used or stored around the home. It is essential for equipment that must be periodically stored to have the capability of being stored in a minimum of space. Increased used of lawn and garden maintenance equipment, recreational vehicles, etc., place a storage space at a premium.

Conventional approaches for reducing the space required for storing a lawn mower have concentrated on reducing the silhouette of the lawn mower in the stored position by providing a foldable or collapsible handle. Examples of this approach may be seen in U.S. Pat. Nos. 3,950,817; 3,816,873; 3,604,817; 3,649,997; 3,485,017; and 3,357,716.

To date, no known attempts have been made to provide a support leg which cooperates with the rear wheels of a lawn mower in combination with a collapsible handle to allow for vertical storage of the lawn mower.

The present invention incorporates many of the known benefits of collapsible handles while improving ease of storage and reducing the space required for storing a lawn mower.

SUMMARY OF THE INVENTION

A lawn mower is provided with a mower deck. The deck has a front portion and a rear portion which defines a rotary blade chamber. A handle assembly is provided which is affixed to the deck. The handle assembly is movable between an extended position and a retracted position. A pair of rear wheels and a pair of front wheels are provided which support the deck above a surface when operating the lawn mower in a generally horizontal mode. A leg is provided which is affixed to the rear portion of the deck and projects outwardly therefrom. The leg and the pair of rear wheels combine to form a support for the lawn mower when storing the lawn mower in a generally vertical position relative to the surface.

In addition, a lawn mower is provided which has a deck which has a front and rear portion and defines a blade chamber. A handle assembly is provided which is affixed to the deck. The handle assembly is movable between a use position and a storage position. A wheel is provided for supporting the rear portion of the deck above a surface when the lawn mower is oriented in a generally horizontal mode. A leg is provided which is affixed to the rear portion and projects outwardly therefrom. The leg and the rear wheel combine to form a support for the lawn mower when the lawn mower is oriented generally vertically to the surface.

A battery powered electric lawn mower is also provided which has a deck having a front portion and a rear portion and defines a rotary blade chamber. A handle assembly is provided which is removably affixed to the deck. The handle assembly is pivotally movable between an extended position and a retracted position. A pair of rear wheels and a pair of front wheels are provided for supporting the deck above a surface when operating the lawn mower in a generally horizontal mode. A plurality of legs are provided which are affixed to the rear portion and project outwardly therefrom. The plurality of legs and the pair of rear wheels combine to form a support for the lawn mower when storing the lawn mower in a generally vertical position relative to the surface.

Furthermore, a foldable handle is provided for use with a lawn mower. A generally U-shaped handle is provided which has a pair of free ends and a closed end. The handle is affixed to the lawn mower at the pair of free ends. An attachment means is provided which cooperates with the pair of free ends for attaching the lawn mower handle. A cam lever is provided which cooperates with said pair of free ends and said attachment means for enabling the foldable handle to be selectively secured in and movable between an extended operating position and a retracted storage position.

Accordingly, an object of the present invention is to provide an electric lawn mower with a leg which cooperates with a pair of rear wheels for supporting the lawn mower in a vertical orientation relative to a surface.

Another object of the present invention is to provide a leg in combination with a foldable handle for reducing the space required to store the lawn mower in a vertical orientation relative to a surface.

A feature of the present invention is to provide a leg affixed to a lawn mower deck which cooperates with the rear wheels of a lawn mower enabling vertical storage of a lawn mower relative to a surface.

A further object of the present invention is to provide an inexpensive method of storing a lawn mower in a vertical orientation relative to a surface.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 is a partial perspective view of the handle assembly showing a cam lever in the locked position for securing the handle assembly;

FIG. 6 is an end view of the handle assembly taken along line 6—6 of FIG. 5;

FIG. 7 is a partial perspective view similar to that shown in FIG. 5 showing the cam lever in the unlocked position; and FIG. 8 is an end view of the handle assembly taken along line 8—8 of FIG. 7.

BEST MODE FOR CARRYING OUT THE INVENTION

Figure 1:
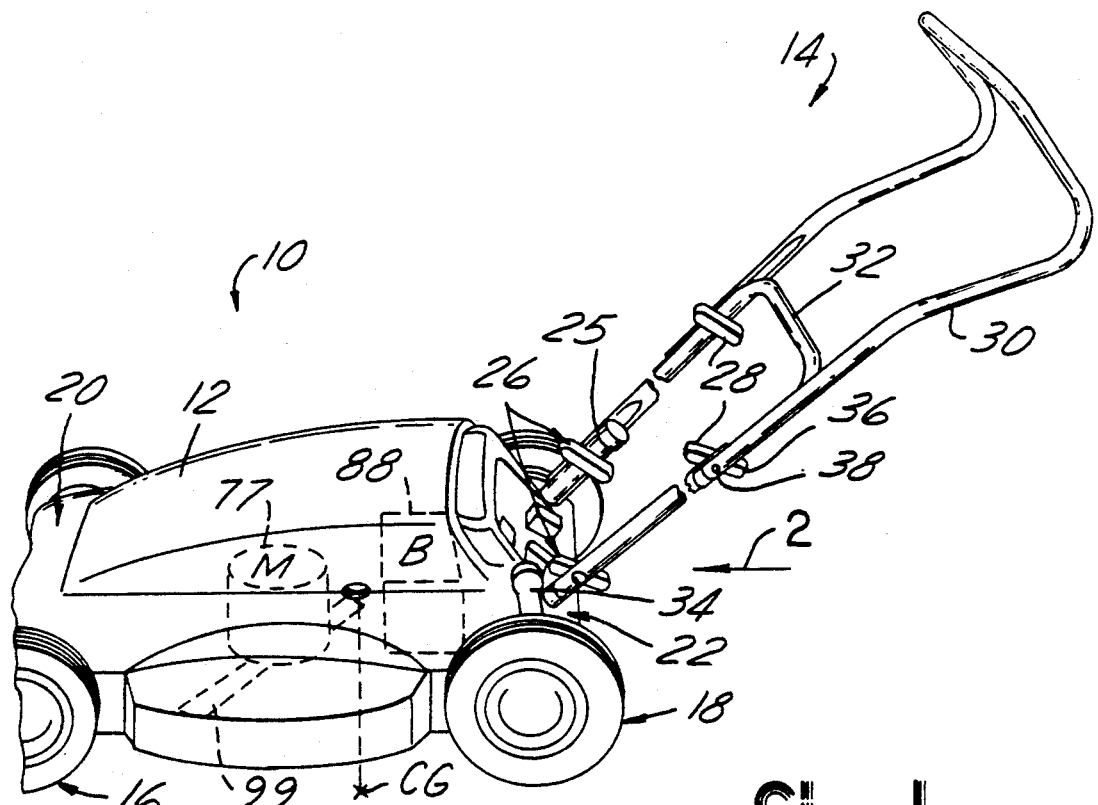
FIG. 1 is a perspective side view of the lawn mower showing the handle assembly in the extended position.
Figure 2:
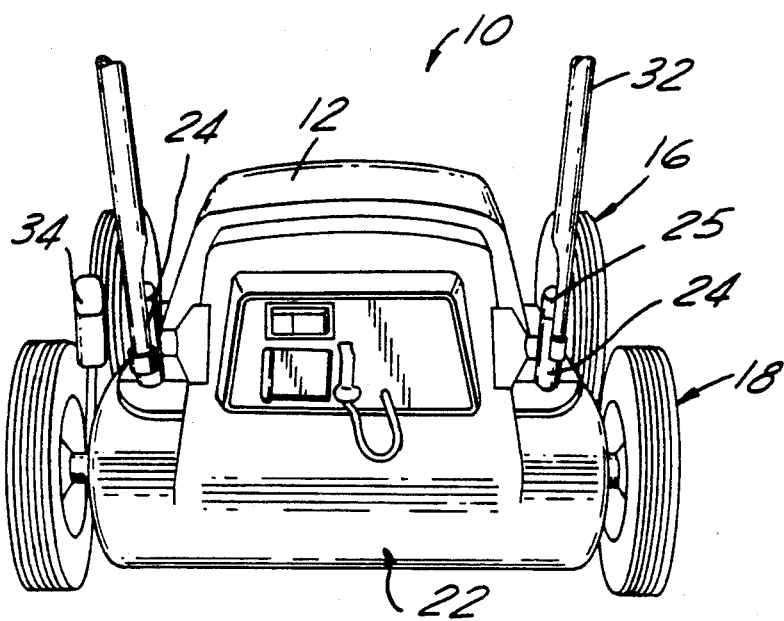
FIG. 2 is a rear end view of the lawn mower taken along line 2 of FIG. 1.

The preferred embodiment shown in FIGS. 1 through 4 illustrates, a lawn mower 10. The lawn mower 10 shown in this embodiment is a battery powered lawn mower. It is understood that the invention may be utilized with an electric lawn mower or a conventional gas mower which is equipped to allow the lawn mower to be stored in a vertical position, while retaining fluids such as gas and oil. The lawn mower 10 as shown in FIG. 1 has an electric motor 77 which receives power from a battery 88 to drive a blade 99.

The lawn mower 10 shown in this embodiment, has a mower deck 12, a handle assembly 14 and a pair of front wheels 16 and a pair of rear wheels 18 which support the deck 12. The deck 12 has a front portion 20 located between the front wheels 16 and a rear portion 22 located between the rear wheels 18.

Figure 3:
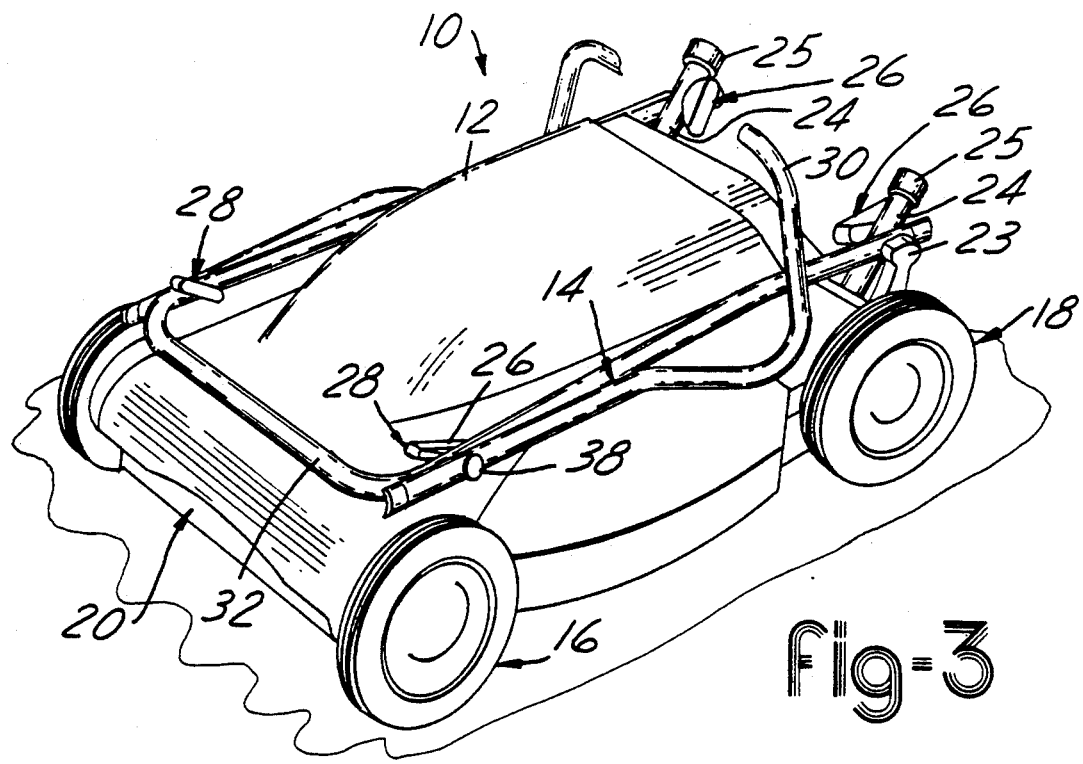
FIG 3 is a perspective view of the lawn mower with the handle assembly in the retracted position showing the lawn mower in a horizontal orientation relative to a surface.

The handle assembly 14 is bifoldably movable between an extended position as shown in FIG. 1 and a retracted position as shown in FIG. 3. The handle assembly 14 is affixed to a pair of legs 24 which in turn are affixed to the rear portion 22 of the deck 12 and project outwardly therefrom. An end cap 25 is located on each of the legs 24. The handle assembly 14 is removably affixed to the legs 24 by a first pair of rotatable knobs 26. The first pair of knobs 26 may be alternatively loosened or tightened to allow the handle assembly 14 to be moved between the extended position and the retracted position and then secured into place once located in the desired position.

Figure 4:
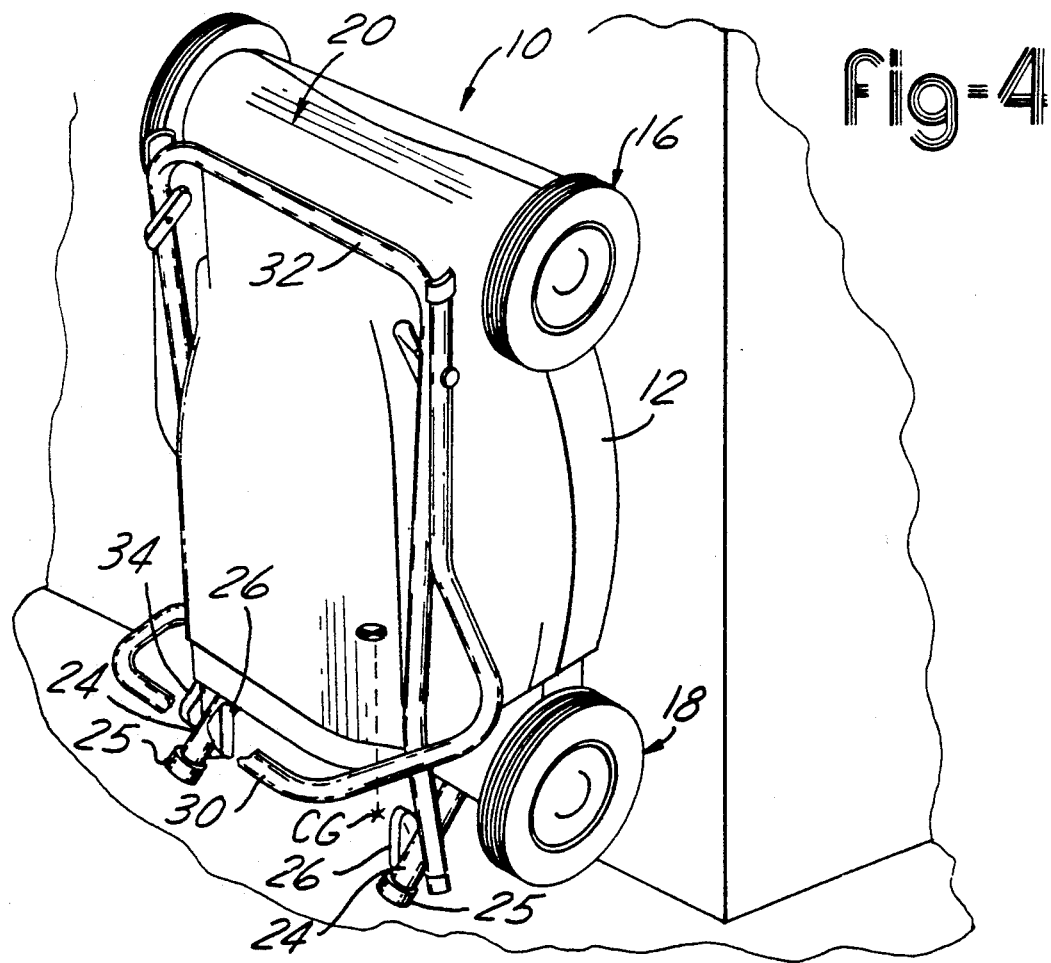
FIG. 4 is a perspective view of the lawn mower showing the handle assembly in a retracted position and showing the lawn mower stored in a vertical orientation relative to a surface.

As shown in FIGS. 3 and 4, the lawn mower 10 may be stored in either a generally horizontal position or a generally vertical position relative a surface. To store the lawn mower 10 in either position, the bifoldable handle assembly 14 must be moved from the extended operating position to the retracted storage position. To do so, a second set of knobs 28 are rotated to loosen or unnest an upper portion 30 of the handle assembly 14 against a lower portion 32 of the handle assembly 14. The lower portion 32 in turn is moved against the deck 12 by loosening the first set of knobs 26. The ability of the handle assembly 14 to be folded back against itself as well as the deck 12 makes the handle assembly 14 bifoldable which provides for a lower silhouette in the retracted storage position. Once the handle assembly 14 is in the retracted storage position, the first and second set of knobs 26 and 28 are tightened so that the legs 24 and the lower portion 32 or the lower portion 32 and the upper portion 30 are in nested relation to secure the handle assembly 14 in the retracted storage position. The lawn mower 10 may now be stored in the horizontal position by rolling the lawn mower 10 to the desired location.

As shown in FIGS. 1 and 3, the first and second set of knobs 26 and 28, respectively, have identical components. Therefore, description of the first set of knobs 26 will serve to describe both the first and second set of knobs 26 and 28. The first set of knobs 26 has a threaded knob portion 36 which threadedly cooperates with a bolt 38, such as a carriage bolt. The knob portion 36 is threaded in a clockwise direction to secure the handle assembly 14 in the desired position. The knob portion 36 is threaded in a counter clockwise direction to loosen the handle assembly 14 allowing the handle assembly 14 to move between the extended operating position shown in FIG. 1 and the retracted storage position shown in FIG. 3.

To store the lawn mower 10 in the vertical position, as shown in FIG. 4, a height lever 34 (shown in FIGS. 1 and 2) is moved to adjust the wheels to the maximum height (the furthest distance away relative to the deck 12). The handle assembly 14 must again be moved to the retracted storage position. The lawn mower 10 is then stood on end, such that the legs 24, which are transversely spaced apart, and the rear wheels 18, set at the maximum height to provide the best stability in the vertical orientation, combine to provide a support for the lawn mower 10. For additional support, the front wheels 16 and rear wheels 18 should be moved either adjacent to or in contact with a solid object such a wall (as shown in FIG. 4) to store the lawn mower 10 in a generally vertical orientation relative the surface. End caps 25, which are rubber or the like, assist in preventing the lawn mower 10 from moving when in the vertical orientation. In the vertical orientation, the center of gravity CG (shown in FIG. 4) is generally located toward the rear portion 22 of the deck 12 and between the rear wheels 18 and the legs 24, to obtain a stable storage position.

As shown in FIGS. 5 through 7, an alternative embodiment is provided for affixing the handle assembly 14 to the pair of legs 24. Rather than utilizing the first and second set of knobs 26 and 28, a first set and second set of cam levers 40 are provided. The first and second set of cam levers 40 serve the same function as the first and second set of knobs 26 and 28. Although not shown separately, the first and second set of cam levers 40 are located in the same corresponding position on the handle assembly 14 as the first and second set of knobs 26 and 28.

The cam levers 40 each have a lever portion 44 which has a cammed surface 46 which cooperates with a bolt 38' (similar to the one used with the first and second set of knobs 26 and 28). Within the cammed surface 46 area of the lever portion 44, a slot 48 is defined in which the bolt 38' travels as the first and second set of cam levers 40 pivot between a locked position (shown in FIGS. 5 and 6) and an unlocked position (shown in FIGS. 7 and 8). A threaded insert 50 secures the bolt 38' to the lever portion 44. The insert 50 also provides a pivot for the lever portion 44 allowing the lever portion 44 to pivot between the locked position and the unlocked position. Prior to being threaded into the insert 50, the bolt 38' passes through both the pair of legs 24 and the lower portion 32 or the lower portion 32 and the upper portion 30 of the handle assembly to form a complete first set and second set of cam levers 40.

To selectively secure the handle assembly 14 in either the extended operating position or the retracted stored position, the lever portion 44 is pivoted about the insert 50 such that the cammed surface 46 in combination with the bolt 38' forcibly cams the two portions, i.e., the leg 24 and the lower portion 32 or the lower portion 32 and the upper portion 30 together in nested relation when in the locked position. To allow the handle assembly 14 to move between the extended operating position and the retracted storage position, the lever portion 44 is pivoted about the insert 50 to the unlocked position so as to move the leg 24 and the lower portion 32 or the lower portion 32 and the upper portion 30 away from each other (i.e., they become unnested) to a distance x (see FIG. 7) which allows the handle assembly 14 to move to the desired position. Once in the desired position, the first and/or second set of cam levers 40 and 42 are moved to the locked position.

FIGS. 7 and 8 illustrate that for the first and second set of cammed levers 40 to work effectively, the cammed surface 46 must have a radius such that $R_1 - R_2 \geq X$. This radius of the cammed surface 46 allows the handle assembly 14 to pivot freely between the extended operating position and the retracted storage position when the first and second cam levers 40 are in the unlocked position and ensures that the handle assembly 14 is securely fastened in the desired position when the first and second set of cammed levers 40 are moved into the locked position.

The lever portion 44 as shown in FIG. 8 contains hollow areas 52 for reducing the weight of the lever portion 44.

While the best mode for carrying out the invention has been described in detail, those familiar with the art to which this invention relates will recognize various alternative designs and embodiments for practicing the invention as defined by the following claims.

What is claimed is:

1. A lawn mower comprising:
   a deck defining a rotary blade chamber having a front portion and a rear portion;
   a handle assembly cooperating with said deck and movable relative thereto between an extended operating position and a retracted storage position;
   a pair of rear wheels and a pair of front wheels for supporting said deck above a surface when operating in a generally horizontal mode; and
   a leg affixed to said deck rear portion and projecting outward therefrom, said leg and said pair of rear wheels oriented relative to one another to stably support said lawn mower on a flat surface when storing said lawn mower in a generally vertical orientation.

2. The lawn mower of claim 1 wherein said leg comprises a pair of legs spaced transversely apart.

3. The lawn mower of claim 2 wherein said handle assembly is pivotally mounted to said legs enabling pivotal movement of said handle assembly between said extended position and said storage position.

4. The lawn mower of claim 2 wherein said handle assembly includes a lower portion pivotally affixed to said pair of legs and said handle assembly includes an upper portion pivotally affixed to said lower portion such that said handle assembly is bifoldable relative said deck between said extended operating position and said retracted storage position.

5. The lawn mower of claim 4 further comprising a plurality of knobs having a knob portion cooperating with a bolt enabling said handle assembly to be selectively located in and movable between said extended operating position and said retracted storage position.

6. The lawn mower of claim 5 wherein said plurality of knobs includes a first set of knobs for controlling pivotal movement of said lower portion of said handle assembly and a second set of knobs for controlling pivotal movement of said upper portion of said handle assembly.

7. The lawn mower of claim 5 wherein said knob portion includes a threaded mounting cooperating with said bolt for selectively securing and loosening said handle assembly.

8. The lawn mower of claim 1 further comprising a plurality of cam levers having a lever portion cooperating with a bolt enabling said handle assembly to be selectively located in and movable between said extended operating position and said retracted storage position.

9. The lawn mower of claim 8 wherein said plurality of cam levers each includes a threaded insert cooperating with said bolt about which said lever portion pivots, and said lever portion defines a slot enabling said bolt to travel therein as said lever portion travels between a locked position securing said handle assembly in one of said extended operating position and said retracted storage position and an unlocked position allowing said handle assembly to move between said extended operating position and said retracted storage position.

10. The lawn mower of claim 8 wherein said lever portion includes a hollow portion for reducing the weight of said lever.

11. A lawn mower comprising:
    a deck defining a blade chamber having a front portion and a rear portion;
    a handle assembly mounted to said deck, said handle assembly movable between an operating position and a storage position;
    a wheel for supporting said rear portion of said deck above a surface when oriented in a generally horizontal mode; and
    a leg affixed to said rear portion and projecting outward therefrom, said leg and said wheel combining to form a stable support for said lawn mower when said lawn mower is oriented generally vertical to the surface.

12. The lawn mower of claim 11 wherein said wheel comprises a pair of rear wheels for supporting said rear portion of said deck.

13. The lawn mower of claim 11 wherein said leg comprises a pair of legs spaced transversely apart.

14. The lawn mower of claim 11 wherein said handle assembly includes a lower portion pivotally affixed to said pair of legs and said handle assembly having an upper portion pivotally affixed to said lower portion such that said handle assembly is bifoldable relative said deck between said extended operating position and said retracted storage position.

15. A battery powered electric lawn mower comprising:
    a deck defining a rotary blade chamber having a front portion and a rear portion;
    a motor located within said deck for driving a rotary blade;
    a battery located within said deck providing electric power to said motor;
    a handle assembly removably affixed to said deck, said handle assembly pivotally movable between an extended position and a retracted position;
    a pair of rear wheels and a pair of front wheels for supporting said deck above a surface when operating said lawn mower in a generally horizontal mode;
    a pair of legs affixed to said rear portion and projecting outward therefrom, said pair of legs and said pair of rear wheels combining to form a support for said lawn mower when storing said lawn mower generally vertical relative the surface.

16. The lawn mower of claim 15 wherein said legs of said pair of legs are spaced transversely apart.

17. The lawn mower of claim 15 wherein said handle assembly is pivotally mounted to said plurality of legs enabling pivotal movement of said handle assembly between said extended position and said storage position.

18. A battery powered electric lawn mower comprising:
    a deck defining a rotary blade chamber;
    a pair of front wheels and a pair of rear wheels supporting said deck;

a bifoldable handle connected to said deck, said handle movable between an operating position and a storage position; and a pair of legs affixed to said deck adjacent said pair of rear wheels, each of said pair of legs located immediately inboard of each respective wheel of said pair of rear wheels, and said pair of legs cooperating with said pair of rear wheels, when said handle is in said storage position, to stably support said lawn mower in a vertical orientation.

19. The lawn mower of claim 18 wherein said handle is generally an inverted "U" shape and free ends of said handle are pivotably attached to said pair of legs.

20. The lawn mower of claim 18 wherein said bifoldable handle is foldable adjacent said deck and foldable about a middle of said handle.

21. The lawn mower of claim 18 wherein said bifoldable handle includes a lower portion pivotally affixed to said pair of legs and said bifoldable handle has an upper portion pivotally affixed to said lower portion.

22. The lawn mower of claim 18 further comprising a plurality of knobs having a knob portion cooperating with a bolt enabling said bifoldable handle assembly to be selectively located in and movable between said extended operating position and said retracted storage position.

23. The lawn mower of claim 22 wherein said plurality of knobs includes a first set of knobs for controlling pivotal movement of said lower portion of said handle assembly and a second set of knobs for controlling pivotal movement of said upper portion of said handle assembly.

24. The lawn mower of claim 22 wherein said knob portion includes a threaded mounting cooperating with said bolt for selectively securing and loosening said handle assembly.

25. The lawn mower of claim 18 further comprising a plurality of cam levers having a lever portion cooperating with a bolt enabling said handle assembly to be selectively located in and movable between said extended operating position and said retracted storage position.

26. The lawn mower of claim 18 wherein said plurality of cam levers each includes a threaded insert cooperating with said bolt about which said lever portion pivots, and said lever portion defines a slot enabling said bolt to travel therein as said lever portion travels between a locked position securing said handle assembly in one of said extended operating position and said retracted storage position and an unlocked position allowing said handle assembly to move between said extended operating position and said retracted storage position.

27. The lawn mower of claim 25 wherein said lever portion includes a hollow portion for reducing the weight of said lever portion.

* * * * *

UNITED STATES PATENT AND TRADEMARK OFFICE
CERTIFICATE OF CORRECTION

PATENT NO. : 5,261,215

DATED : November 16, 1993

INVENTOR(S) : Adrian E. Hartz et al

It is certified that error appears in the above-identified patent and that said Letters Patent is hereby corrected as shown below:

Column 8, Line 14, Claim 26 (Appln. Page 16, Line 20, Claim 26), "18" should be --25--;

Signed and Sealed this

Twenty-second Day of November, 1994

*Attest:*

BRUCE LEHMAN

*Attesting Officer*     *Commissioner of Patents and Trademarks*